(12) United States Patent  
Sawanishi et al.

(10) Patent No.: US 11,623,298 B2  
(45) Date of Patent: Apr. 11, 2023

(54) RESISTANCE SPOT WELDING METHOD AND WELD MEMBER PRODUCTION METHOD

(71) Applicant: JFE STEEL CORPORATION, Tokyo (JP)

(72) Inventors: Chikaumi Sawanishi, Tokyo (JP); Hiroshi Matsuda, Tokyo (JP); Rinsei Ikeda, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 515 days.

(21) Appl. No.: 16/635,165

(22) PCT Filed: Aug. 2, 2018

(86) PCT No.: PCT/JP2018/029108  
§ 371 (c)(1),  
(2) Date: Jan. 30, 2020

(87) PCT Pub. No.: WO2019/035367  
PCT Pub. Date: Feb. 21, 2019

(65) Prior Publication Data  
US 2021/0023646 A1 Jan. 28, 2021

(30) Foreign Application Priority Data

Aug. 18, 2017 (JP) .............................. JP2017-157919  
Mar. 22, 2018 (JP) .............................. JP2018-055051

(51) Int. Cl.  
*B23K 11/11* (2006.01)  
*B23K 11/25* (2006.01)

(52) U.S. Cl.  
CPC ........... *B23K 11/115* (2013.01); *B23K 11/255* (2013.01); *B23K 11/257* (2013.01); *B23K 11/258* (2013.01)

(58) Field of Classification Search  
CPC ....... B23K 11/00; B23K 11/11; B23K 11/115; B23K 11/24; B23K 11/25; B23K 11/257; B23K 11/258; B23K 11/16  
See application file for complete search history.

(56) References Cited

U.S. PATENT DOCUMENTS 6,057,523 A 5/2000 Fujii et al.  
6,130,396 A 10/2000 Hasegawa et al.  
(Continued)

FOREIGN PATENT DOCUMENTS

CN 102974931 A 3/2013  
CN 105189014 A 12/2015  
(Continued)

OTHER PUBLICATIONS

Aug. 5, 2020, the Extended European Search Report issued by the European Patent Office in the corresponding European Patent Application No. 18846169.3.  
(Continued)

*Primary Examiner* — Dana Ross  
*Assistant Examiner* — Ayub A Maye  
(74) *Attorney, Agent, or Firm* — Kenja IP Law PC

(57) ABSTRACT

A resistance spot welding method comprises: performing test welding; and performing actual welding after the test welding. The test welding is performed under each of two or more welding conditions. In the actual welding, preliminary current passage is performed by constant current control in the same current pattern as in the preliminary current passage of the test welding, an electrical property between the electrodes in the preliminary current passage in the actual welding and an electrical property between the electrodes stored in the preliminary current passage in the test welding are compared for each welding condition to set a target in main current passage in the actual welding, and (Continued)

thereafter adaptive control welding is performed to control a current passage amount as the main current passage.

11 Claims, 9 Drawing Sheets

(56) References Cited

U.S. PATENT DOCUMENTS

| | | | |
|---|---|---|---|
| 9,486,875 B2 | 11/2016 | Hasegawa et al. | |
| 9,821,404 B2 | 11/2017 | Sawanishi et al. | |
| 10,081,074 B2 | 9/2018 | Sawanishi et al. | |
| 10,328,518 B2 | 6/2019 | Okita et al. | |
| 10,730,134 B2 | 8/2020 | Furusako et al. | |
| 2010/0065533 A1* | 3/2010 | Buda | B23K 11/115 219/110 |
| 2012/0248086 A1* | 10/2012 | Watanabe | B23K 11/257 219/162 |
| 2016/0271720 A1* | 9/2016 | Sawanishi | B23K 11/115 |
| 2017/0072502 A1* | 3/2017 | Karagoulis | B23K 11/16 |
| 2018/0281102 A1 | 10/2018 | Sawanishi et al. | |

FOREIGN PATENT DOCUMENTS

| | | |
|---|---|---|
| CN | 106132622 A | 11/2016 |
| CN | 106255566 A | 12/2016 |
| CN | 106457453 A | 2/2017 |
| EP | 3088119 A1 | 11/2016 |
| JP | H09216071 A | 8/1997 |
| JP | H1094883 A | 4/1998 |
| JP | H1133743 A | 2/1999 |
| JP | 2003236674 A | 8/2003 |
| JP | 2006043731 A | 2/2006 |
| JP | 2012061487 A | 3/2012 |
| JP | 5907317 B1 | 4/2016 |
| JP | 5988015 B1 | 9/2016 |
| WO | 2014136507 A1 | 9/2014 |
| WO | 2015190082 A1 | 12/2015 |

OTHER PUBLICATIONS

Oct. 2, 2018, International Search Report issued in the International Patent Application No. PCT/JP2018/029108.

Apr. 6, 2021, Office Action issued by the China National Intellectual Property Administration in the corresponding Chinese Patent Application No. 201880050956.9 with English language search report.

* cited by examiner

RESISTANCE SPOT WELDING METHOD AND WELD MEMBER PRODUCTION METHOD

TECHNICAL FIELD

The present disclosure relates to a resistance spot welding method. The present disclosure is particularly intended to ensure a stable nugget diameter without expulsion (splash) even in the case where the effect of a disturbance such as current shunting or a sheet gap is significant.

BACKGROUND

Overlapping steel sheets are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. With this welding method, heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

For good weld quality, it is important to form the nugget with a diameter in an appropriate range. The nugget diameter depends on the welding condition such as welding current, welding time, electrode shape, and electrode force. To achieve an appropriate nugget diameter, the welding condition needs to be set appropriately according to the parts-to-be-welded condition such as the material, sheet thickness, and number of overlapping sheets of the parts to be welded.

In vehicle manufacturing, for example, spot welding is performed at several thousand points per vehicle, and parts to be welded (workpieces) conveyed one after another need to be welded. If the state of the parts to be welded such as the material, sheet thickness, and number of overlapping sheets of the parts to be welded is the same at each welding location, the same welding condition such as welding current, welding time, and electrode force can be used to obtain the same nugget diameter. In continuous welding, however, the contact surfaces of the electrodes with the parts to be welded wear gradually and the contact areas widen gradually as compared with the initial state. When the same welding current as in the initial state is passed in such a state in which the contact areas have widened, the current density in the parts to be welded decreases and the temperature rise of the weld decreases. This results in a decrease in nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used, too. To use the stepper function, the above-mentioned welding current change pattern needs to be set appropriately beforehand. However, considerable time and cost are required to derive the welding current change patterns corresponding to numerous welding conditions and parts-to-be-welded conditions through tests and the like. Besides, since the state of progress of electrode wear varies in actual work, the welding current change pattern set beforehand may not always be appropriate.

In addition, in the case where there is a disturbance during welding, such as when a point that has already been welded (existing weld) is present near the current welding point or when the parts to be welded have considerable surface roughness and a contact point of the parts to be welded is present near the welding point, part of the current is shunted into such an existing weld or contact point during welding. In this state, even when welding is performed under a predetermined condition, the current density at the position to be welded which is directly above and below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are strongly restrained due to surface roughness, member shape, etc. or in the case where foreign matter is present between the steel sheets around the welding point, a larger sheet gap between the steel sheets causes a smaller contact diameter of the steel sheets, which may facilitate expulsion.

The following techniques have been proposed to solve the problems stated above.

For example, JP 2003-236674 A (PTL 1) proposes "a high tensile strength steel sheet spot welding method for spot-welding high tensile strength steel sheets whereby spot welding is performed through the following steps: a first step of gradually increasing a current to high tensile strength steel sheets to form a nugget; a second step of decreasing the current after the first step; and a third step of, after the second step, increasing the current to perform actual welding and gradually decreasing the current."

JP 2006-43731 A (PTL 2) proposes "a current control method in spot welding in a spot welding device that squeezes parts to be welded by a pair of facing electrodes and, while applying an electrode force, passes a welding current between the electrodes to spot-weld the parts to be welded, whereby such a current that can suppress spattering is maintained for a predetermined time in an initial part of welding time to soften the surfaces of the parts to be welded and then a high current is maintained for a predetermined time to grow a nugget while suppressing spattering."

JP H9-216071 A (PTL 3) proposes "a control unit of a resistance welder, comprising: a welding current detector; a voltage between electrodes detector; a temperature distribution estimator that estimates a temperature distribution 1 of a weld from temporal changes in the welding current and the voltage between electrodes detected by the detectors; an inductance characteristic value calculator that calculates an inductance characteristic value of the weld from the temporal changes in the welding current and the voltage between electrodes; an adjustor that adjusts the temperature distribution estimator based on a result of comparison between the temperature distribution 1 estimated by the temperature distribution estimator and a temperature distribution 2 estimated using the inductance characteristic value; and a controller that controls at least one of a welding current, a welding time, and an electrode force as a welding condition using the temperature distribution 1."

JP H10-94883 A (PTL 4) proposes "a welding condition control method for a resistance welder of detecting a welding current and a voltage between tips, applying a heat transfer simulator that simulates a weld by heat transfer calculation from both detection values, estimating a state quantity representing a nugget formation state in the weld during welding, comparing the state quantity with a reference state quantity at the time of estimation, and, based on the comparison result, correcting a welding condition and also correcting the structure of the heat transfer simulator by, for example, inserting an interface resistor according to a monitor value indicating a welding state after welding start, to match the state quantity to the reference state quantity."

JP H11-33743 A (PTL 5) proposes "a resistance welding system that includes a pair of electrodes for squeezing parts to be welded, a power supply device for passing a welding current between the pair of electrodes, and a control unit for controlling the power supply device, and performs a procedure of calculating an amount of heat generated per unit volume and per unit time from a cumulative amount of heat generated per unit volume with which good welding of the parts to be welded is possible, and adjusting the welding current or voltage to generate the calculated amount of heat per unit volume and per unit time."

CITATION LIST

Patent Literatures

PTL 1: JP 2003-236674 A
PTL 2: JP 2006-43731 A
PTL 3: JP H9-216071 A
PTL 4: JP H10-94883 A
PTL 5: JP H11-33743 A
PTL 6: WO 2014/136507 A1

SUMMARY

Technical Problem

However, with the techniques described in PTL 1 and PTL 2, given that an appropriate welding condition is likely to vary depending on the presence or absence of a disturbance and the magnitude of the disturbance, a desired nugget diameter cannot be ensured without expulsion when a larger sheet gap or current shunting than expected occurs.

The techniques described in PTL 3 and PTL 4 need complex calculation to estimate the nugget temperature based on a heat transfer model (heat transfer simulation) and the like. This requires a welding control unit that is not only complex in structure but also expensive.

The technique described in PTL 5 enables good welding even with certain electrode wear, by adjusting the cumulative amount of heat generated to the target. However, in the case where the set parts-to-be-welded condition and the actual parts-to-be-welded condition are significantly different, such as when a disturbance such as the above-mentioned existing weld is present nearby, or in the case where the time variation pattern of the amount of heat generated changes greatly in a short period of time, such as when welding hot-dip galvanized steel sheets having a large coating amount, adaptive control cannot keep up. Even when the final cumulative amount of heat generated can be adjusted to the target, the heat generation pattern, namely, the time variation of the temperature distribution of the weld, deviates from the target heat pattern for obtaining a good weld. This hinders the obtainment of a required nugget diameter, or causes expulsion.

For example, an attempt to adjust the cumulative amount of heat generated to the target in the case where the effect of current shunting is significant causes marked heat generation not between the steel sheets but between the electrodes and the steel sheets, and facilitates expulsion from the steel sheet surfaces.

Further, while the techniques described in PTL 3 to PTL 5 are all effective to some extent for the change in the case where the electrode tips wear, these techniques do not take into consideration the situations where the effect of current shunting is significant because of, for example, the presence of an existing weld nearby. Hence, adaptive control does not actually function in some cases.

In view of this, we previously developed the following method and disclosed it in WO 2014/136507 A1 (PTL 6): "A method of resistance spot welding to join parts to be welded by squeezing the parts between a pair of electrodes and passing a current while applying an electrode force, the parts being a plurality of overlapping metal sheets, the method comprising: dividing a current pattern into two or more steps for welding; before actual welding, performing test welding to store, for each step as a target, a time variation of an instantaneous amount of heat generated per unit volume and a cumulative amount of heat generated per unit volume that are calculated from an electrical property between the electrodes when forming an appropriate nugget by passing a current with constant current control; and subsequently, as actual welding, starting welding using, as a standard, a time variation curve of the instantaneous amount of heat generated per unit volume obtained by the test welding, and when an amount of time variation of an instantaneous amount of heat generated deviates during any step from the time variation curve by a difference, performing adaptive control welding to control a current passage amount in order to compensate for the difference during a remaining welding time in the step so as to match a cumulative amount of heat generated in the actual welding to the cumulative amount of heat generated that is determined in advance in the test welding."

With the technique described in PTL 6, a nugget of a good diameter can be obtained even in the case where the electrode tips wear or a disturbance is present.

However, in the case where the effect of a disturbance is particularly significant, such as when a large nugget diameter needs to be ensured, when an existing weld is present immediately nearby or many existing welds are present around the welding point, or when the sheet gap between the steel sheets is large, excessive heat may be generated near the electrodes and cause expulsion. A satisfactory nugget diameter cannot be obtained in such a case.

It could be helpful to provide, as an improvement on the technique described in PTL 6, a resistance spot welding method that, even in the case where the effect of a disturbance is particularly significant as mentioned above, can obtain a nugget of an appropriate diameter without expulsion or an increase in welding time.

It could also be helpful to provide a weld member production method using the resistance spot welding method.

Solution to Problem

We conducted intensive study to achieve the object stated above.

As mentioned earlier, in the case where the effect of a disturbance is significant or further the electrode tips wear, even when adaptive control welding is performed with the cumulative amount of heat generated that is obtained by the test welding being set as the target according to the technique described in PTL 6, the heat generation pattern, namely, the time variation of the temperature distribution (hereafter also referred to as "heat pattern") of the weld may differ from the target condition (i.e. the time variation of the temperature distribution of the weld when a good weld is obtained in the test welding). This hinders the obtainment of a required nugget diameter, or causes expulsion.

We examined this point more closely, and discovered the following: Before the start of resistance spot welding and in an initial stage of welding, the resistance between the steel sheets at the welding point is high, that is, the current passage diameter has not been secured yet. Accordingly, when adaptive control welding is performed with the cumulative amount of heat generated that is obtained by the test welding being set as the target in the case where a disturbance is present, e.g. in the case where the effect of current shunting is significant, the welding current is excessively large in a state in which the current passage diameter between the steel sheets has not been secured in the initial stage of welding. This causes marked heat generation not between the steel sheets but between the electrodes and the steel sheets, and results in a large difference in heat generation pattern from the test welding.

Besides, particularly in the case where the sheet gap between the steel sheets is large, the steel sheets warp greatly along the electrode shape. The contact area between the electrodes and the steel sheets thus increases, as compared with the case where there is no sheet gap. Hence, the current density near the electrodes decreases, and heat releasing to the electrodes is promoted. Consequently, nugget growth in the sheet thickness direction is hindered, and a thin nugget tends to form.

Further, a phenomenon that, with a decrease in the volume of a fusion zone, the specific resistance of the weld decreases and the voltage between electrodes decreases can occur. In the case of performing adaptive control welding using, as the target, the time variation of the instantaneous amount of heat generated per unit volume and the cumulative amount of heat generated per unit volume, the welding control unit recognizes such a decrease in voltage between electrodes as a decrease in the amount of heat generated. Consequently, the welding control unit rapidly increases the welding current even if actually an appropriate nugget diameter has been obtained. This causes expulsion.

In view of the above, we conducted further examination, and discovered the following: Even in the case where the effect of a disturbance is significant or further the electrode tips wear, a nugget of an appropriate diameter can be obtained without expulsion by:

performing test welding under several welding conditions, and storing, for each condition, a time variation curve of an instantaneous amount of heat generated per unit volume and a cumulative amount of heat generated per unit volume (hereafter also simply referred to as "time variation curve, etc."); and performing actual welding by performing adaptive control welding with an optimal time variation curve, etc. from among the stored time variation curves, etc. being set as a target based on a disturbance state and the like.

As a result of further conducting examination, we discovered the following:

To select the optimal time variation curve, etc. from the plurality of time variation curves, etc., it is effective to use the effect of a disturbance that appears in a very initial stage of current passage as an index, that is, to perform preliminary current passage before main current passage and select a time variation curve, etc. as a target from the electrical property between the electrodes in the preliminary current passage.

Consequently, the heat pattern of the weld in the adaptive control welding can follow the heat pattern in the test welding even in the case where the effect of a disturbance is particularly significant. A nugget of an appropriate diameter can thus be obtained without expulsion or an increase in welding time.

In real operation such as vehicle manufacturing, parts to be welded which are conveyed one after another are continuously welded. Typically, the disturbance state varies among welding positions and parts to be welded, depending on work conditions, dimensional errors of parts to be welded, and so on.

With the foregoing welding method, the time variation curve, etc. are set from the electrical property between the electrodes in the preliminary current passage, based on the disturbance state. A desired nugget diameter can thus be stably ensured by effectively responding to variations in the disturbance state. This is very advantageous in improving operating efficiency in real operation and yield rate.

The present disclosure is based on these discoveries and further studies.

We thus provide:

1. A resistance spot welding method of squeezing, by a pair of electrodes, parts to be welded which are a plurality of overlapping metal sheets, and passing a current while applying an electrode force to join the parts to be welded, the resistance spot welding method comprising: performing test welding; and performing actual welding after the test welding, wherein the test welding is performed under each of two or more welding conditions, in the test welding, for each of the welding conditions: preliminary current passage is performed by constant current control in a same current pattern, and an electrical property between the electrodes in the preliminary current passage is stored; and thereafter main current passage is performed by constant current control, and a time variation curve of an instantaneous amount of heat generated per unit volume and a cumulative amount of heat generated per unit volume that are calculated from an electrical property between the electrodes in forming an appropriate nugget are stored, and in the actual welding: preliminary current passage is performed by constant current control in the same current pattern as in the preliminary current passage of the test welding, an electrical property between the electrodes in the preliminary current passage in the actual welding and an electrical property between the electrodes stored in the preliminary current passage in the test welding are compared to determine a difference therebetween for each of the welding conditions of the test welding, and a time variation curve of an instantaneous amount of heat generated per unit volume and a cumulative amount of heat generated per unit volume in the main current passage in the test welding that are stored for a welding condition corresponding to a smallest difference are set as a target in main current passage in the actual welding; and thereafter adaptive control welding is performed to control a current passage amount according to the target, as the main current passage in the actual welding.

2. The resistance spot welding method according to 1., wherein in the adaptive control welding, welding is performed with the time variation curve of the instantaneous amount of heat generated per unit volume and the cumulative amount of heat generated being set as the target, and in the case where an amount of time variation of an instantaneous amount of heat generated per unit volume differs from the time variation curve, the current passage amount is controlled in order to compensate for the difference from the time variation curve within a remaining welding time so that a cumulative amount of heat generated per unit volume in the main current passage in the actual welding matches the cumulative amount of heat generated per unit volume set as the target.

3. The resistance spot welding method according to 1. or 2., wherein in the test welding, at least one welding condition is that welding is performed in a simulated state of a disturbance, and an other welding condition is that welding is performed in a state of no disturbance.

4. The resistance spot welding method according to any one of 1. to 3., wherein the test welding is performed under each of three or more welding conditions.

5. The resistance spot welding method according to any one of 1. to 4., wherein a relationship $$Fp<Fm$$

is satisfied, where Fp is a set electrode force in the preliminary current passage in the test welding and Fm is a set electrode force in the main current passage in the test welding.

6. A weld member production method comprising joining a plurality of overlapping metal sheets by the resistance spot welding method according to any one of 1. to 5.

Advantageous Effect

It is thus possible to obtain a good nugget without expulsion or an increase in welding time even in the case where the effect of a disturbance is particularly significant, such as when a large nugget diameter is needed, when an existing weld is present immediately nearby or many existing welds are present around the welding point, or when the sheet gap between the steel sheets is large.

It is also possible to stably ensure a desired nugget diameter by effectively responding to variations in the disturbance state, even when continuously welding parts to be welded which are conveyed one after another in real operation such as vehicle manufacturing (even when the disturbance state vary among welding positions or parts to be welded). This is very advantageous in improving operating efficiency and yield rate.

DETAILED DESCRIPTION

Figure 1:
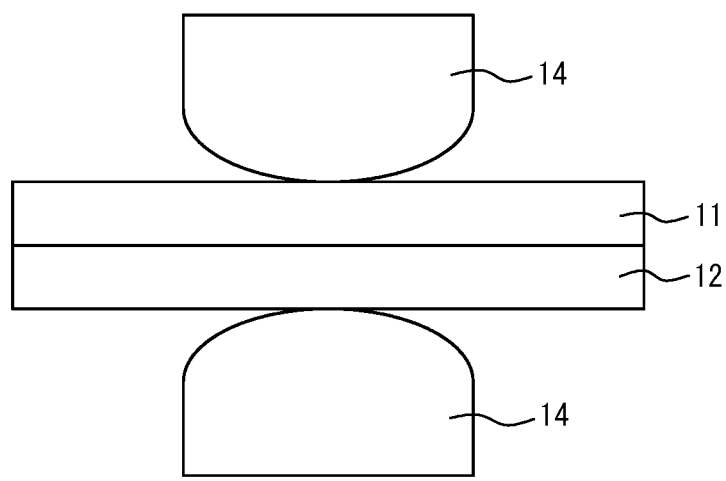
FIG. 1 is a diagram schematically illustrating an example of the case of performing test welding on a sheet combination of two overlapping sheets in a state of no disturbance.

The presently disclosed techniques will be described below by way of embodiments.

One of the disclosed embodiments relates to a resistance spot welding method of squeezing, by a pair of electrodes, parts to be welded which are a plurality of overlapping metal sheets, and passing a current while applying an electrode force to join the parts to be welded. The resistance spot welding method comprises: performing test welding; and performing actual welding after the test welding. The test welding is performed under each of two or more welding conditions. In the test welding, for each of the welding conditions: preliminary current passage is performed by constant current control in a same current pattern, and an electrical property between the electrodes in the preliminary current passage is stored; and thereafter main current passage is performed by constant current control, and a time variation curve of an instantaneous amount of heat generated per unit volume and a cumulative amount of heat generated per unit volume that are calculated from an electrical property between the electrodes in forming an appropriate nugget are stored. In the actual welding: preliminary current passage is performed by constant current control in the same current pattern as in the preliminary current passage of the test welding, an electrical property between the electrodes in the preliminary current passage in the actual welding and an electrical property between the electrodes stored in the preliminary current passage in the test welding are compared to determine a difference therebetween for each of the welding conditions of the test welding, and a time variation curve of an instantaneous amount of heat generated per unit volume and a cumulative amount of heat generated per unit volume in the main current passage in the test welding that are stored for a welding condition corresponding to a smallest difference are set as a target in main current passage in the actual welding; and thereafter adaptive control welding is performed to control a current passage amount according to the target, as the main current passage in the actual welding.

Any welding device that includes a pair of upper and lower electrodes and is capable of freely controlling each of the electrode force and the welding current during welding may be used in the resistance spot welding method according to one of the disclosed embodiments. The force mechanism (air cylinder, servomotor, etc.), the type (stationary, robot gun, etc.), the electrode shape, and the like are not limited.

Herein, the "electrical property between the electrodes" means the resistance between electrodes or the voltage between electrodes.

The test welding and the actual welding in the resistance spot welding method according to one of the disclosed embodiments will be described below.

Test Welding

The test welding is performed under each of two or more welding conditions and preferably under each of three or more welding conditions. For each welding condition, preliminary current passage and main current passage are performed.

The preliminary current passage is performed by constant current control, and the electrical property between the electrodes in the preliminary current passage is stored.

Thereafter, the main current passage is performed by constant current control, and a time variation curve of an instantaneous amount of heat generated per unit volume and a cumulative amount of heat generated per unit volume that are calculated from the electrical property between the electrodes in forming an appropriate nugget are stored.

The combination of the welding conditions in the test welding where data are stored is preferably made up of at least one welding condition of performing welding in a simulated state of a disturbance expected in the actual welding and a welding condition of performing welding in a state of no disturbance.

Examples of the disturbance expected in the actual welding include the above-mentioned disturbances such as current shunting and a sheet gap, e.g. an existing weld within 40 mm from the welding position (electrode center position) and a gap of 0.2 mm or more between the mating surfaces of the steel sheets as the parts to be welded.

For example, in the case where it is expected that there is an existing weld within 40 mm from the welding position and the distance therebetween varies for each welding position, preferably one welding condition in the test welding is that welding is performed in a state in which an existing weld is present at a position of 6 mm to 30 mm (preferably 6 mm to 20 mm) away from the welding position, and another welding condition is that welding is performed in a state of no disturbance. Typically, the lower limit of the distance from the welding position to the existing weld expected is about 6 mm. The number of existing welds simulated in the test welding may be 1, or 2 or more. No upper limit is placed on the number of existing welds simulated in the test welding, and the number is preferably the largest number of existing welds expected (specifically, about 3). The size of the existing weld simulated in the test welding may be approximately the same as the size of the existing weld expected.

Herein, the distance between the welding position and the existing weld is the distance between the respective centers of the welding position and the existing weld.

In the case where it is expected that there is a gap of 0.2 mm or more between the mating surfaces of the metal sheets as the parts to be welded and the gap varies for each welding position, preferably one welding condition in the test welding is that welding is performed in a state in which there is a gap of 0.2 mm to 3.0 mm (preferably 0.5 mm to 3.0 mm) between the mating surfaces of the metal sheets as the parts to be welded, and another welding condition is that welding is performed in a state of no disturbance. The upper limit of the gap between the mating surfaces of the metal sheets as the parts to be welded as expected is practically about 3.0 mm.

Herein, the gap between the mating surfaces of the metal sheets is the gap between the mating surfaces of the metal sheets (the distance between the mating surfaces) at the welding position before the electrode force is applied.

Depending on variations of expected disturbances and the like, preferably one welding condition in the test welding is that welding is performed in a state in which an existing weld is present as mentioned above, another welding condition is that welding is performed in a state in which there is a gap between the mating surfaces of the metal sheets as the parts to be welded as mentioned above, and yet another welding condition is that welding is performed in a state of no disturbance. Thus, an appropriate time variation curve can be selected by effectively responding to various disturbance states.

The current pattern in the preliminary current passage is not limited as long as constant current control is used. The target in the main current passage in the actual welding is set depending on the electrical property between the electrodes, etc. in this preliminary current passage. Accordingly, the current pattern (welding current, welding time, and set electrode force) in the preliminary current passage in the test welding is the same for all welding conditions. An error of about 5% is, however, allowable for each of the welding current, the welding time, and the set electrode force.

To prevent an increase in welding time and excessive heat generation during the preliminary current passage, the welding time Tp in the preliminary current passage is preferably 400 ms or less. The welding time Tp is more preferably 200 ms or less. No lower limit is placed on the welding time Tp in the preliminary current passage, but the lower limit is preferably 10 ms. In the case where a nugget is formed in the preliminary current passage, the nugget diameter (mm) is preferably $4\sqrt{t}$ or less (t: the sheet thickness (mm) of the thinnest steel sheet). Moreover, a welding interval time Tc of 20 ms or more and 1000 ms or less is preferably provided between the preliminary current passage and the subsequent main current passage.

The current pattern in the main current passage is not limited. The current pattern may be divided into two or more steps, and the cumulative amount of heat generated per unit volume may be stored for each step. The current pattern in the main current passage is typically divided into five steps or less.

The set electrode force in the preliminary current passage in the test welding may be the same as the set electrode force in the main current passage, but the relationship $Fp<Fm$ is preferably satisfied where Fp is the set electrode force in the preliminary current passage in the test welding and Fm is the set electrode force in the main current passage in the test welding.

As mentioned earlier, particularly in the case where the sheet gap between the steel sheets is large, nugget growth in the sheet thickness direction is hindered, and a thin nugget tends to form. Further, with a decrease in the volume of a fusion zone, the specific resistance of the weld tends to decrease, causing a decrease in voltage between electrodes. If the voltage between electrodes decreases, in the case of performing adaptive control welding using, as the target, the time variation of the instantaneous amount of heat generated per unit volume and the cumulative amount of heat generated per unit volume, the welding control unit recognizes such a decrease in voltage between electrodes as a decrease in the amount of heat generated. Consequently, the welding control unit rapidly increases the welding current even when actually an appropriate nugget diameter has been obtained. This can cause expulsion.

In view of this, it is important in the present disclosure that the preliminary current passage is performed before the main current passage, and the time variation curve, etc. as the target in the main current passage in the actual welding is selected from the electrical property between the electrodes in the preliminary current passage that takes into account the effect of a disturbance such as the foregoing sheet gap between the steel sheets.

However, if the set electrode force Fp in the preliminary current passage in the test welding is large, particularly if the set electrode force Fp in the preliminary current passage is more than the set electrode force Fm in the main current passage, the current passage state (specifically, the contact diameter between the steel sheets) in the preliminary current passage in the case where there is a sheet gap is close to the current passage state in the preliminary current passage in the case where there is no sheet gap, and the effect of a disturbance is not sufficiently reflected in the electrical property between the electrodes in the preliminary current passage. This may make it difficult to appropriately select the time variation curve, etc. as the target in the main current passage in the actual welding.

If the set electrode force Fp in the preliminary current passage is less than the set electrode force Fm in the main current passage in the test welding, on the other hand, the effect of a disturbance is appropriately reflected in the electrical property between the electrodes in the preliminary current passage, so that the time variation curve, etc. as the target in the main current passage in the actual welding can be selected more appropriately.

Therefore, it is preferable to satisfy the relationship Fp<Fm. It is more preferable to satisfy the relationship Fp<0.9×Fm. No lower limit is placed on Fp, but the lower limit is preferably 0.1×Fm.

The set electrode force Fm in the main current passage is preferably 1.0 kN or more. The set electrode force Fm in the main current passage is preferably 10.0 kN or less.

To prevent expulsion in the preliminary current passage in the test welding, it is preferable to satisfy the relationship Ip<Im where Ip is the welding current in the preliminary current passage and Im is the welding current in the main current passage in the test welding.

Particularly when welding high tensile strength steel sheets or the like for which the appropriate current range is narrow, it is more preferable to satisfy the relationship Ip<0.8×Im.

In the case where the current pattern in the main current passage is divided into two or more steps, Im is an average value of the welding currents in all current passage steps. For example, in the case where the current pattern in the main current passage is divided into two steps, Im=(I1+I2)/2, where I1 and I2 are the respective welding currents in the first and second current passage steps. No lower limit is placed on Ip, but the lower limit is preferably 0.2×Im.

The welding current Im in the main current passage is preferably 4.0 kA or more. The welding current Im in the main current passage is preferably 12.0 kA or less.

The test welding conditions other than the above are not limited, and may be set as appropriate by performing a preliminary welding test for the same steel type and thickness as the parts to be welded, under various conditions by constant current control in each of a state of no disturbance and the foregoing simulated state of a disturbance.

Actual Welding

After the test welding, the actual welding is performed.

In the actual welding, first, preliminary current passage is performed by constant current control in the same current pattern as in the preliminary current passage of the test welding. The electrical property between the electrodes in the preliminary current passage in the actual welding and the electrical property between the electrodes stored in the preliminary current passage in the test welding are compared to determine the difference therebetween for each of the welding conditions of the test welding, and a time variation curve of an instantaneous amount of heat generated per unit volume and a cumulative amount of heat generated per unit volume in the main current passage in the test welding that are stored for a welding condition corresponding to the smallest difference are set as the target in the main current passage in the actual welding.

In the case where current shunting to an existing weld occurs, typically the voltage between electrodes decreases as compared with the case where no current shunting occurs. Accordingly, for example, an average value of the voltage between electrodes for a predetermined time (100 ms) from the start of the preliminary current passage stored in the preliminary current passage in the test welding and an average value of the voltage between electrodes for 100 ms from the start of the preliminary current passage in the actual welding are compared to determine the difference therebetween for each welding condition, and a time variation curve of an instantaneous amount of heat generated per unit volume and a cumulative amount of heat generated per unit volume in the main current passage in the test welding that are stored for a welding condition corresponding to the smallest difference are set as the target in the main current passage in the actual welding.

A maximum value or amount of time variation of the voltage between electrodes, an average value, maximum value, or amount of time variation of the resistance between electrodes, a cumulative amount of heat generated in the preliminary current passage, or the like may be used as an index for setting the target in the main current passage.

Herein, "preliminary current passage is performed by constant current control in the same current pattern as in the preliminary current passage of the test welding" means that the preliminary current passage in the actual welding is performed by constant current control using the same welding current, welding time, and set electrode force as those in the preliminary current passage in the test welding. An error of about 5% is, however, allowable for each of the welding current, the welding time, and the set electrode force.

Thereafter, adaptive control welding is performed to control the current passage amount according to the target set as a result of the preliminary current passage, as the main current passage.

For example, in the adaptive control welding in the main current passage, welding is performed with the time variation curve of the instantaneous amount of heat generated per unit volume and the cumulative amount of heat generated being set as the target as a result of the preliminary current passage. If the amount of time variation of the instantaneous amount of heat generated per unit volume follows the time variation curve, the welding is continued without change and completed. If the amount of time variation of the instantaneous amount of heat generated per unit volume differs from the time variation curve, the current passage amount is controlled in order to compensate for the difference within a remaining welding time so that the cumulative amount of heat generated per unit volume in the main current passage in the actual welding matches the cumulative amount of heat generated per unit volume set as the target.

The method of calculating the amount of heat generated is not limited. PTL 5 describes an example of the method, which may be used herein. The following is the procedure of calculating the amount q of heat generated per unit volume and per unit time and the cumulative amount Q of heat generated per unit volume according to this method.

Let t be the total thickness of the parts to be welded, r be the electrical resistivity of the parts to be welded, V be the voltage between electrodes, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \qquad (1).$$

The electrical resistance R of the columnar portion is given by the following Equation (2):

$$R=(r \cdot t)/S \qquad (2).$$

Solving Equation (2) for S and substituting the solution into Equation (1) yields the amount q of heat generated as indicated by the following Equation (3):

$$q=(V \cdot I \cdot R)/(r \cdot t^2)=(V^2)/(r \cdot t^2) \qquad (3).$$

As is clear from Equation (3), the amount q of heat generated per unit volume and per unit time can be calculated from the voltage between electrodes V, the total thickness t of the parts to be welded, and the electrical resistivity r of the parts to be welded, and is not affected by the contact area S of the electrodes and the parts to be welded. Although the amount of heat generated is calculated from the voltage between electrodes V in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 5, the cumulative amount Q may be calculated by any other method.

In the case where the current pattern in the main current passage in the test welding is divided into two or more steps and the target of adaptive control welding is set based on the data stored in the test welding with a welding condition divided into the two or more steps as mentioned above, the current pattern in the main current passage in the actual welding is preferably divided into two or more steps as with the current pattern in the main current passage in the test welding and the adaptive control welding is preferably performed for each step in the main current passage in the actual welding.

In the adaptive control welding for each step, if the amount of time variation of the instantaneous amount of heat generated per unit volume in the step differs from the time variation curve, the current passage amount is controlled in order to compensate for the difference within a remaining welding time in the step so that the cumulative amount of heat generated per unit volume in the step matches the cumulative amount of heat generated per unit volume in the step in the test welding.

The set electrode force Fm' in the main current passage may be basically the same as the test welding condition set as the target in the main current passage in the actual welding, but may be different from the test welding condition according to need. It is preferable to satisfy the relationship $$Fp'<Fm'$$

where Fp' is the set electrode force in the preliminary current passage in the actual welding and Fm' is the set electrode force in the main current passage in the actual welding. It is more preferable to satisfy the relationship Fp'<0.9×Fm'. No lower limit is placed on Fp', but the lower limit is preferably 0.1×Fm'.

The set electrode force Fm' in the main current passage is preferably 1.0 kN or more. The set electrode force Fm' in the main current passage is preferably 10.0 kN or less.

The parts to be welded that are used are not limited. The resistance spot welding method may be used for welding of steel sheets and coated steel sheets having various strengths from mild steel to ultra high tensile strength steel and light metal sheets of aluminum alloys and the like. The resistance spot welding method may also be used for a sheet combination of three or more overlapping steel sheets.

Moreover, a subsequent current may be applied to heat-treat the weld after the current for nugget formation. The current passage condition in this case is not limited, and the magnitude relationships with the welding currents in the preceding steps are not limited. A current pattern of an upslope or a downslope may be used. The electrode force in the current passage may be constant, or be changed as appropriate.

By joining a plurality of overlapping metal sheets by the resistance spot welding method described above, various weld members, in particular weld members of automotive parts and the like, are produced while stably ensuring a desired nugget diameter by effectively responding to variations in the disturbance state.

EXAMPLES

Test welding was performed under the conditions listed in Table 1 for each sheet combination of two or three overlapping metal sheets listed in Table 1, and then actual welding was performed under the conditions listed in Table 2 for each sheet combination of two or three overlapping metal sheets listed in Table 2, to produce a weld joint.

Figure 2:
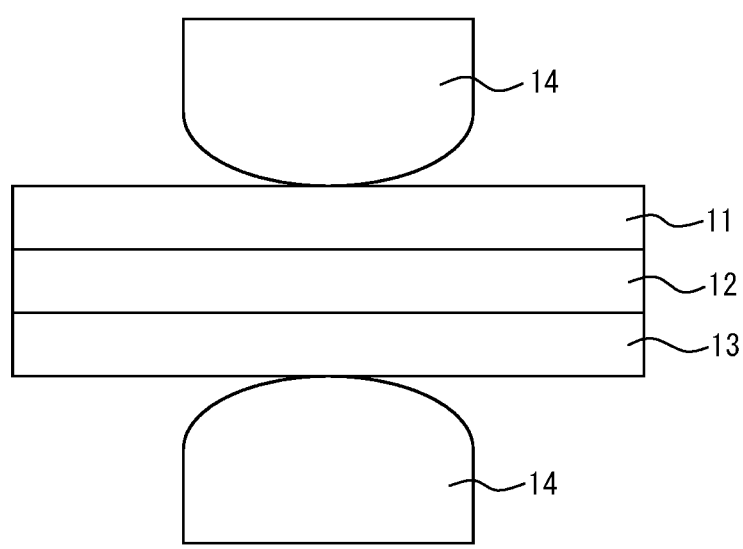
FIG. 2 is a diagram schematically illustrating an example of the case of performing test welding on a sheet combination of three overlapping sheets in a state of no disturbance.
Figure 3:
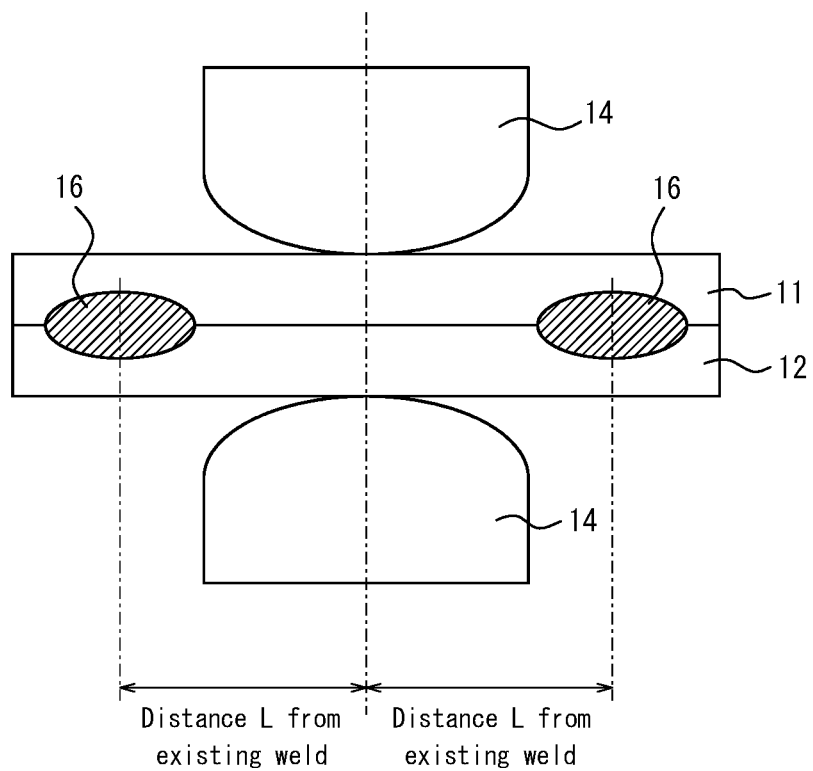
FIG. 3 is a diagram schematically illustrating an example of the case of performing test welding on a sheet combination of two overlapping sheets having an existing weld.
Figure 4:
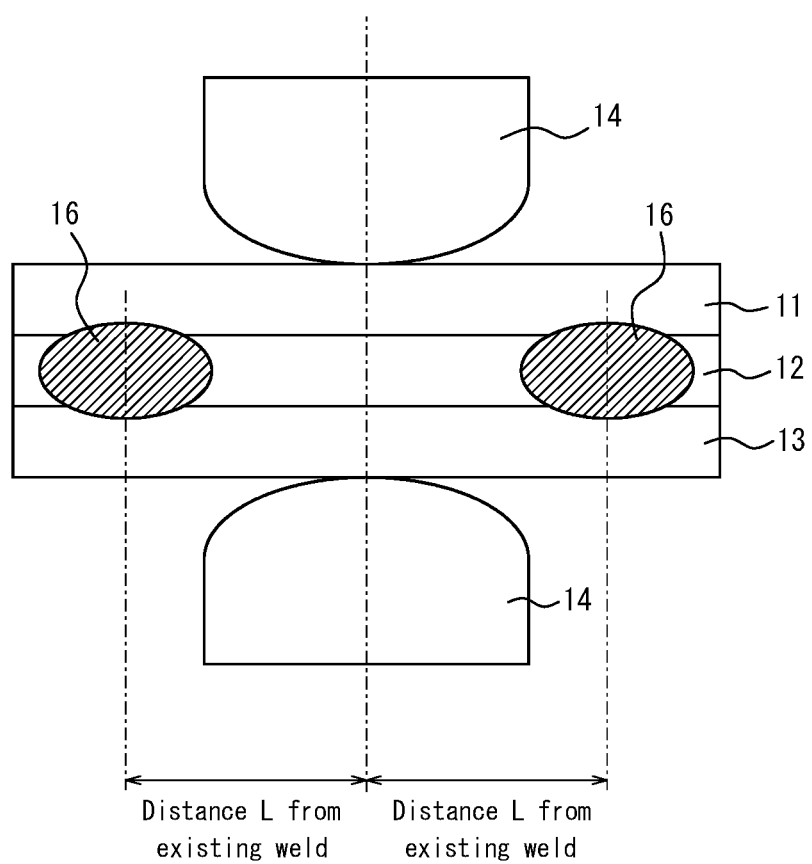
FIG. 4 is a diagram schematically illustrating an example of the case of performing test welding on a sheet combination of three overlapping sheets having an existing weld.
Figure 5:
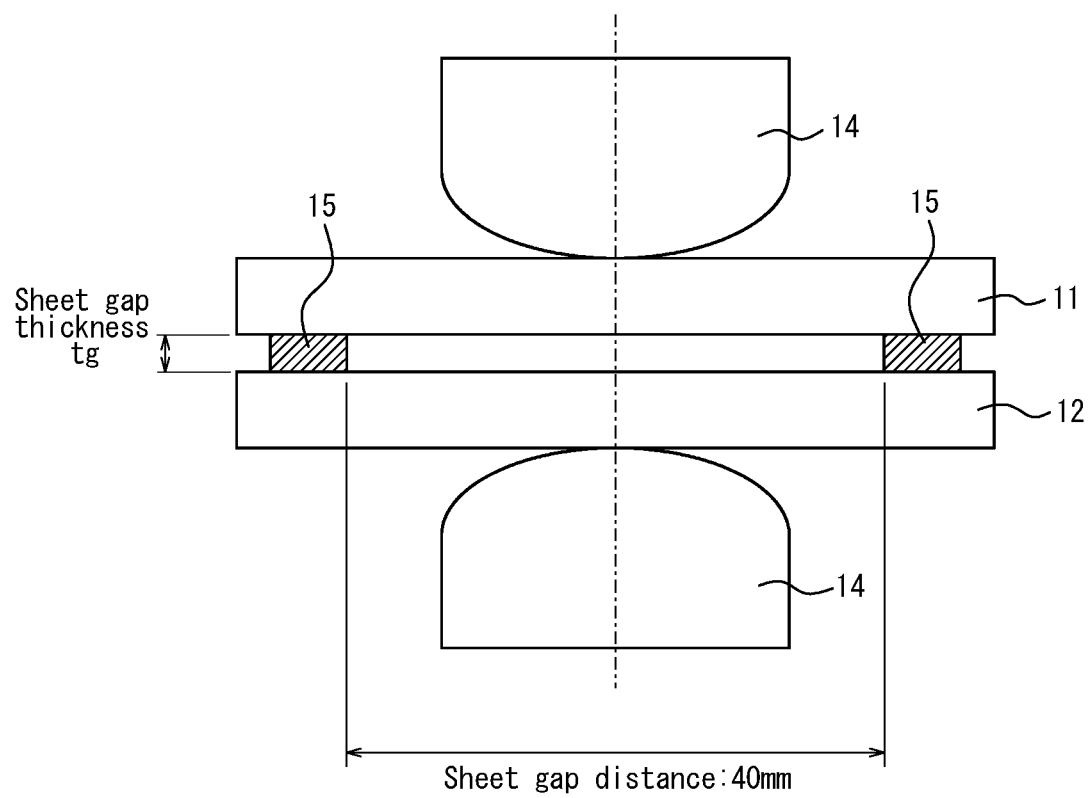
FIG. 5 is a diagram schematically illustrating an example of the case of performing test welding on a sheet combination of two overlapping sheets having a sheet gap.
Figure 6:
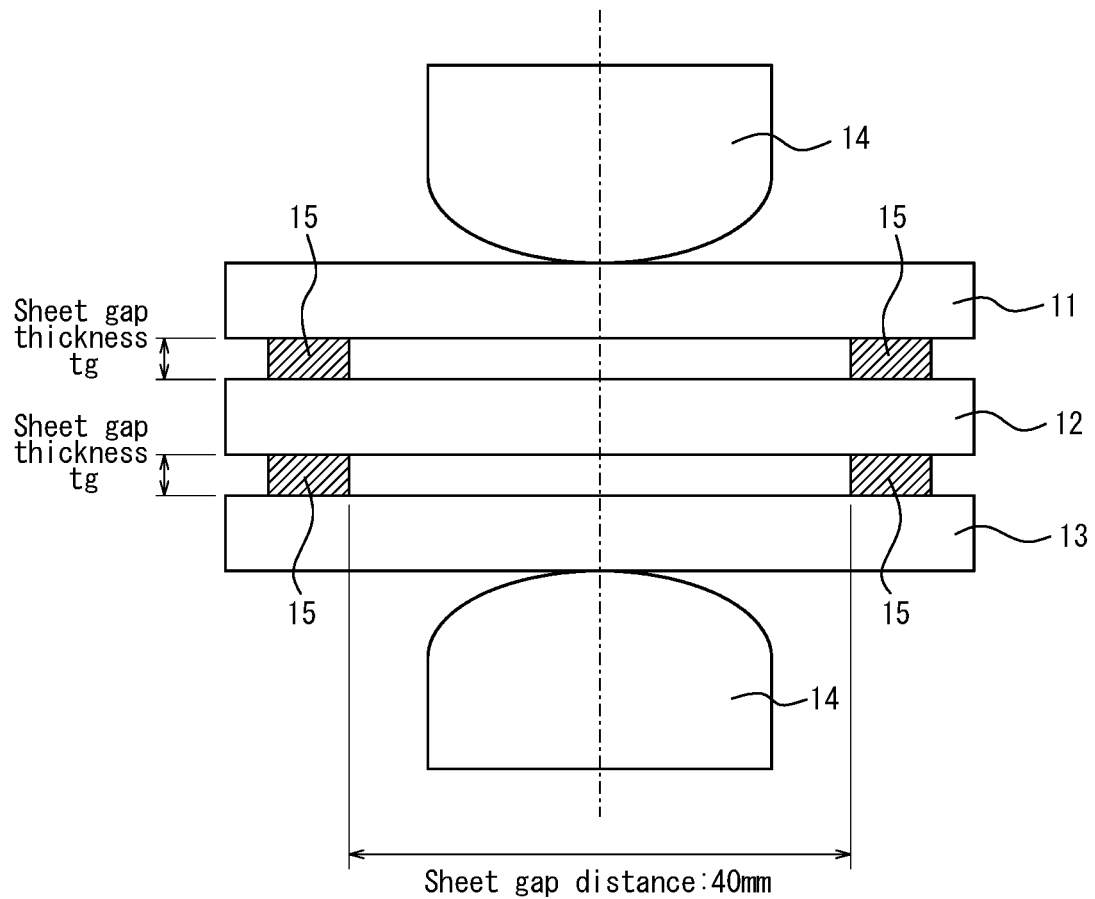
FIG. 6 is a diagram schematically illustrating an example of the case of performing test welding on a sheet combination of three overlapping sheets having a sheet gap.
Figure 7:
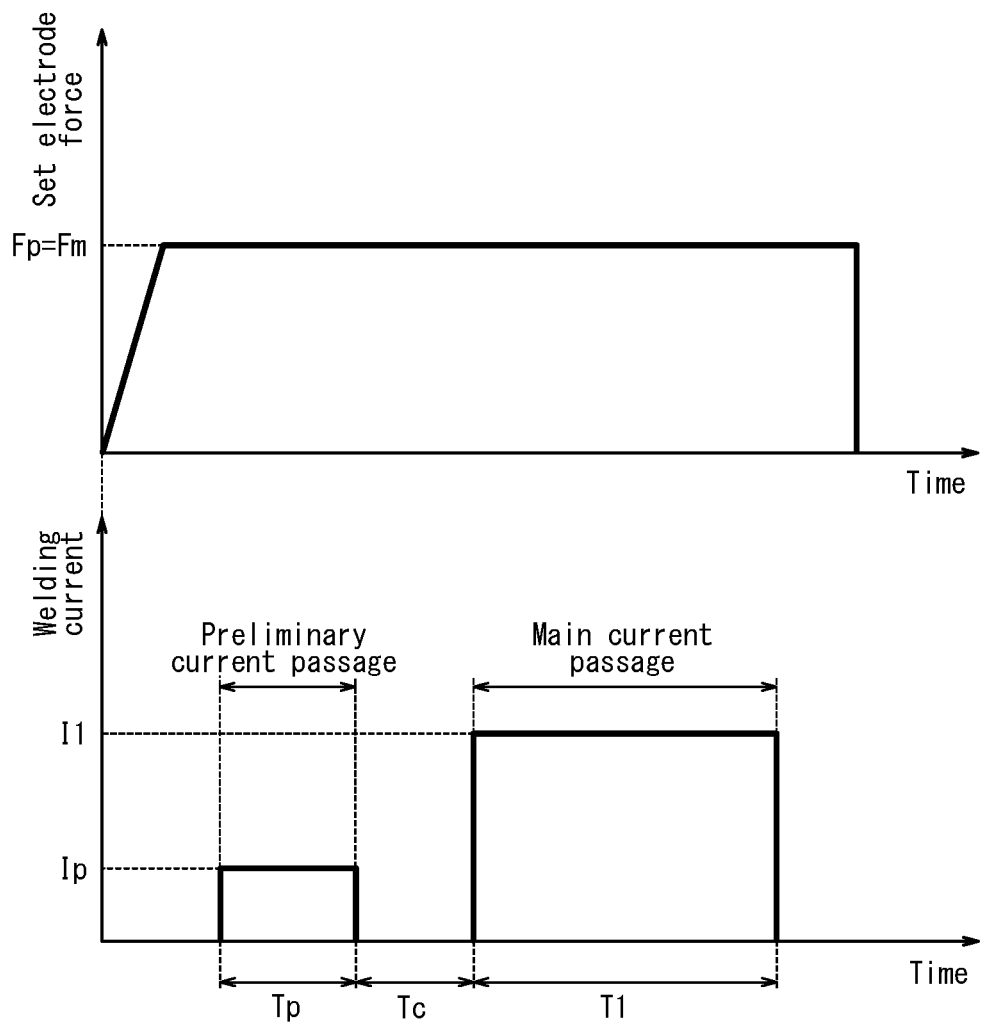
FIG. 7 is a diagram schematically illustrating an example of a current pattern in test welding (in the case where main current passage is one-step current passage and the set electrode force is the same in preliminary current passage and main current passage)
Figure 8:
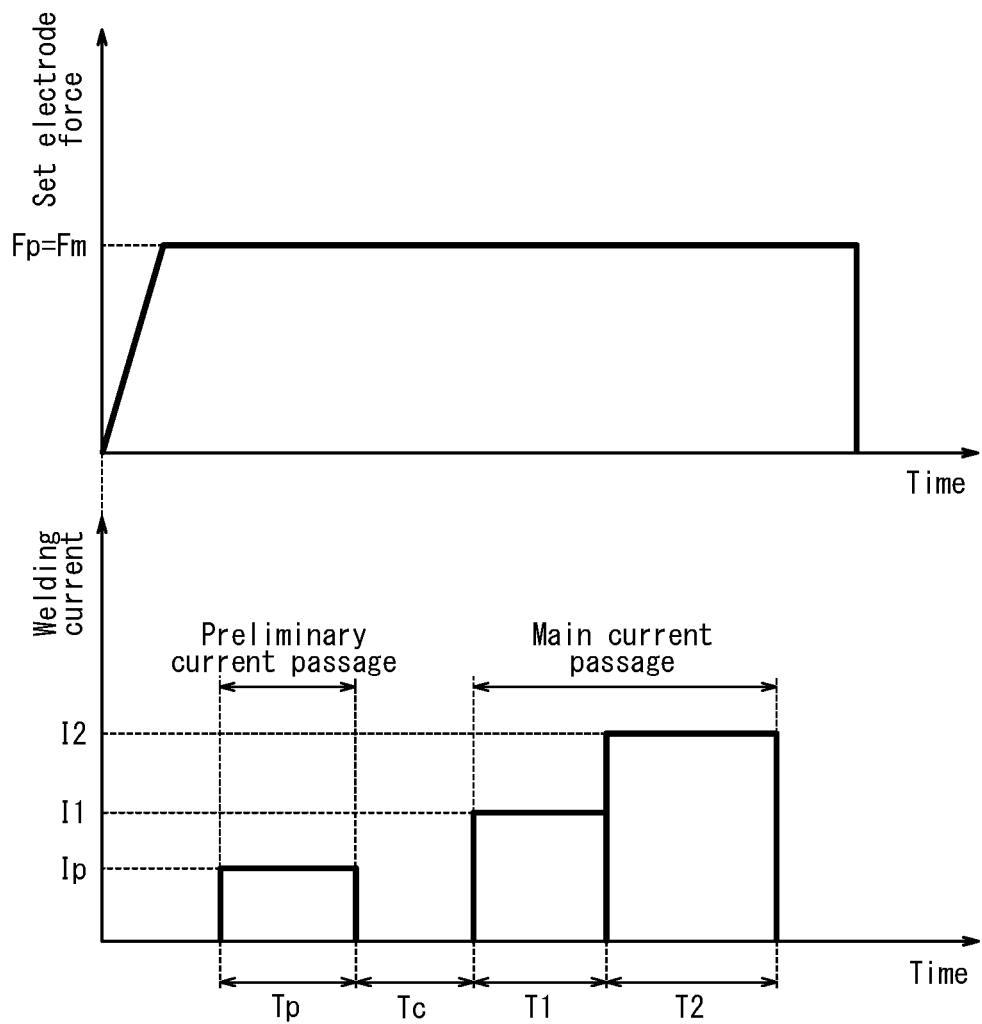
FIG. 8 is a diagram schematically illustrating an example of a current pattern in test welding (in the case where main current passage is two-step current passage and the set electrode force is the same in preliminary current passage and main current passage)
Figure 9:
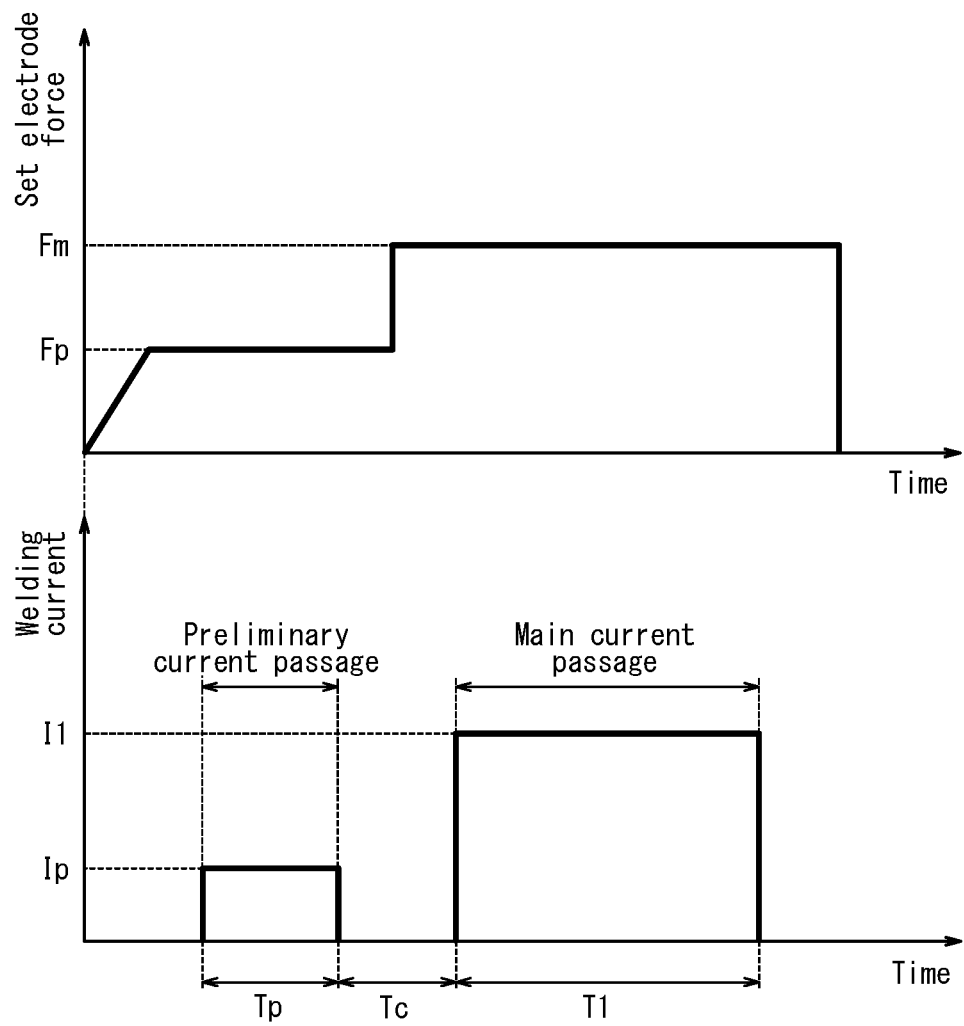
FIG. 9 is a diagram schematically illustrating an example of a current pattern in test welding (in the case where main current passage is one-step current passage and the set electrode force is different between preliminary current passage and main current passage)
Figure 10:
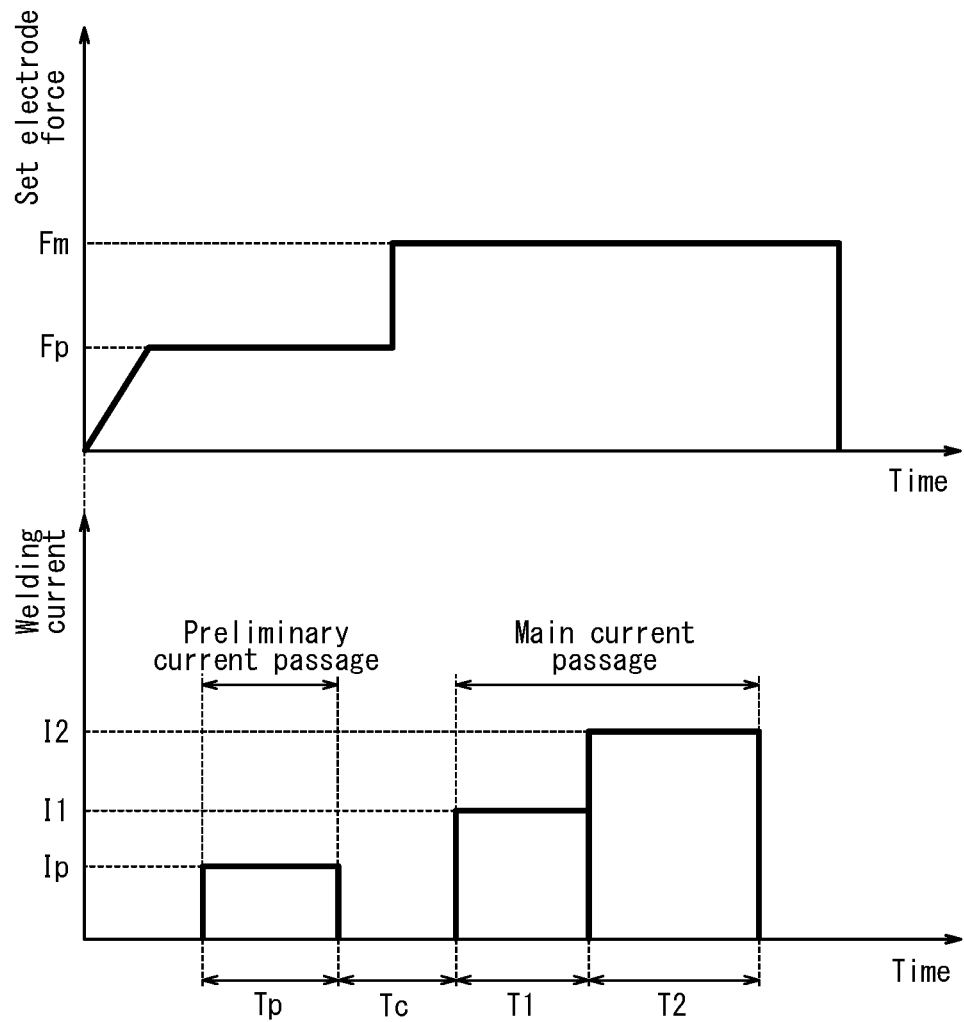
FIG. 10 is a diagram schematically illustrating an example of a current pattern in test welding (in the case where main current passage is two-step current passage and the set electrode force is different between preliminary current passage and main current passage).

The test welding and the actual welding were performed in a state of no disturbance as illustrated in each of FIGS. 1 and 2, and in a simulated state of a disturbance as illustrated in each of FIGS. 3 to 6. In the drawings, reference signs 11, 12, and 13 are each a metal sheet, 14 is an electrode, 15 is a spacer, and 16 is an existing weld. As illustrated in FIGS. 3 and 4, there were two existing welds 16, and the welding position (the center between the electrodes) was adjusted to be at a midpoint between the existing welds (i.e. the same distance L from each existing weld). In FIGS. 5 and 6, spacers 15 were inserted between the metal sheets 11 and 12 and between the metal sheets 12 and 13, and the sheet combination was clamped from above and below (not illustrated), to create a sheet gap of any of various sheet gap thicknesses tg. The sheet gap distance was 40 mm in all cases.

In the test welding, preliminary current passage and main current passage were performed by constant current control for each welding condition, in each of the patterns of current and electrode force illustrated in FIGS. 7 to 10. Preliminary current passage was not performed in test welding No. D in Table 1.

In the actual welding, first, preliminary current passage was performed by constant current control in the same current pattern as in the preliminary current passage of the test welding. For the voltage between electrodes (average value) as an index to set the target in the main current passage, the value in the preliminary current passage in the actual welding and the value stored in the preliminary current passage in the test welding were compared to determine the difference therebetween for each welding condition (compared test welding No. in Table 2), and the time variation curve of the instantaneous amount of heat generated per unit volume and the cumulative amount of heat generated per unit volume stored for the welding condition corresponding to the smallest difference were set as the target in the main current passage in the actual welding. Thereafter, adaptive control welding was performed to control the current passage amount according to the target, as the main current passage in the actual welding. In No. 3 in Table 2, preliminary current passage was not performed. The conditions such as the welding time and the electrode force in the main current passage and the welding interval time between the preliminary current passage and the main current passage were the same in the test welding and the actual welding. In the case of setting the target of adaptive control welding based on a test welding condition divided into two or more steps, adaptive control welding for each step was performed in the main current passage in the actual welding.

An inverter DC resistance spot welder was used as the welder, and chromium copper electrodes with 6 mm face diameter DR-shaped tips were used as the electrodes.

For each obtained joint, the weld was cut and etched in section, and then observed with an optical microscope. Each sample in which the nugget diameter between the metal sheets was not less than $4.5\sqrt{t'}$ as a target diameter (t': the sheet thickness (mm) of the thinner metal sheet of adjacent two metal sheets) and no expulsion occurred was evaluated as good. Each sample in which any nugget diameter was less than $4.5\sqrt{t'}$ or expulsion occurred was evaluated as poor. For a sheet combination of three overlapping sheets, evaluation was conducted based on the nugget diameter between the thinnest outer metal sheet and the metal sheet adjacent to it.

TABLE 1

| | Test welding condition | | | | | | | |
|---|---|---|---|---|---|---|---|---|
| | Sheet combination | | | Preliminary current passage | | | | |
| Test welding No. | Steel sheet of reference sign 11 in the drawings | Steel sheet of reference sign 12 in the drawings | Steel sheet of reference sign 13 in the drawings | Set electrode force Fp (kN) | Welding current Ip (kA) | Welding time Tp (ms) | Average value of voltage between electrodes (V) | Welding interval time Tc (ms) |
| A | 980 MPa-grade cold-rolled steel sheet (sheet thickness: 1.6 mm) | 980 MPa-grade cold-rolled steel sheet (sheet thickness: 1.6 mm) | | 5.0 | 4.0 | 100 | 1.2 | 100 |
| B | 980 MPa-grade cold-rolled steel sheet (sheet thickness: 1.6 mm) | 980 MPa-grade cold-rolled steel sheet (sheet thickness: 1.6 mm) | | 5.0 | 4.0 | 100 | 1.4 | 100 |
| C | 980 MPa-grade cold-rolled steel sheet (sheet thickness: 1.6 mm) | 980 MPa-grade cold-rolled steel sheet (sheet thickness: 1.6 mm) | | 5.0 | 4.0 | 100 | 0.9 | 100 |
| D | 980 MPa-grade cold-rolled steel sheet (sheet thickness: 1.6 mm) | 980 MPa-grade cold-rolled steel sheet (sheet thickness: 1.6 mm) | | | | | | |
| E | 1180 MPa-grade cold-rolled steel sheet (sheet thickness: 1.6 mm) | 1180 MPa-grade cold-rolled steel sheet (sheet thickness: 1.6 mm) | | 5.0 | 2.0 | 100 | 1.9 | 140 |
| F | 1180 MPa-grade cold-rolled steel sheet (sheet thickness: 1.6 mm) | 1180 MPa-grade cold-rolled steel sheet (sheet thickness: 1.6 mm) | | 5.0 | 2.0 | 100 | 1.4 | 140 |

TABLE 1-continued

| | | | | | | | | |
|---|---|---|---|---|---|---|---|---|
| G | 1180 MPa-grade cold-rolled steel sheet (sheet thickness: 1.6 mm) | 1180 MPa-grade cold-rolled steel sheet (sheet thickness: 1.6 mm) | | 5.0 | 2.0 | 100 | 2.0 | 140 |
| H | 1180 MPa-grade GA steel sheet (sheet thickness: 1.6 mm) | 1180 MPa-grade GA steel sheet (sheet thickness: 1.6 mm) | | 3.0 | 2.0 | 120 | 1.7 | 160 |
| I | 1180 MPa-grade GA steel sheet (sheet thickness: 1.6 mm) | 1180 MPa-grade GA steel sheet (sheet thickness: 1.6 mm) | | 3.0 | 2.0 | 120 | 1.4 | 160 |
| J | 1180 MPa-grade GA steel sheet (sheet thickness: 1.6 mm) | 1180 MPa-grade GA steel sheet (sheet thickness: 1.6 mm) | | 3.0 | 2.0 | 120 | 2.5 | 160 |
| K | 1470 MPa-grade cold-rolled steel sheet (sheet thickness: 1.6 mm) | 1470 MPa-grade cold-rolled steel sheet (sheet thickness: 1.6 mm) | | 3.0 | 2.0 | 100 | 0.5 | 160 |
| L | 1470 MPa-grade cold-rolled steel sheet (sheet thickness: 1.6 mm) | 1470 MPa-grade cold-rolled steel sheet (sheet thickness: 1.6 mm) | | 3.0 | 2.0 | 100 | 0.3 | 160 |
| M | 1470 MPa-grade cold-rolled steel sheet (sheet thickness: 1.6 mm) | 1470 MPa-grade cold-rolled steel sheet (sheet thickness: 1.6 mm) | | 3.0 | 2.0 | 100 | 0.9 | 160 |
| N | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 2.5 | 2.5 | 80 | 1.2 | 160 |
| O | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 2.5 | 2.5 | 80 | 0.9 | 160 |
| P | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 2.5 | 2.5 | 80 | 1.6 | 160 |
| Q | 1470 MPa-grade GA steel sheet (sheet thickness: 1.0 mm) | 1470 MPa-grade GA steel sheet (sheet thickness: 1.0 mm) | | 3.0 | 3.0 | 200 | 0.4 | 200 |
| R | 1470 MPa-grade GA steel sheet (sheet thickness: 1.0 mm) | 1470 MPa-grade GA steel sheet (sheet thickness: 1.0 mm) | | 3.0 | 3.0 | 200 | 0.3 | 200 |
| S | 1470 MPa-grade GA steel sheet (sheet thickness: 1.0 mm) | 1470 MPa-grade GA steel sheet (sheet thickness: 1.0 mm) | | 3.0 | 3.0 | 200 | 0.5 | 200 |
| T | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 3.0 | 3.0 | 60 | 1.4 | 100 |
| U | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 3.0 | 3.0 | 60 | 1.1 | 100 |
| V | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 3.0 | 3.0 | 60 | 1.9 | 100 |
| W | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 3.0 | 3.0 | 100 | 1.6 | 240 |

TABLE 1-continued

| | | | | | | | | |
|---|---|---|---|---|---|---|---|---|
| X | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 3.0 | 3.0 | 100 | 1.2 | 240 |
| Y | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 3.0 | 3.0 | 100 | 2.0 | 240 |

| | Test welding condition | | | | | |
|---|---|---|---|---|---|---|
| | Main current passage | | | | | |
| Test welding No. | Set electrode force Fm (kN) | Welding current I1 (kA) | Welding time T1 (ms) | Welding current I2 (kA) | Welding time T2 (ms) | Disturbance state |
| A | 5.0 | 7.5 | 320 | | | None |
| B | 5.0 | 9.0 | 320 | | | Existing weld L = 10 mm |
| C | 5.0 | 7.0 | 320 | | | Sheet gap tg = 1.0 mm |
| D | 5.0 | 7.5 | 320 | | | None |
| E | 5.0 | 5.0 | 140 | 8.0 | 260 | None |
| F | 5.0 | 7.0 | 140 | 9.0 | 260 | Existing weld L = 10 mm |
| G | 5.0 | 4.0 | 160 | 7.5 | 260 | Sheet gap tg = 1.0 mm |
| H | 5.5 | 8.5 | 320 | | | None |
| I | 5.5 | 9.5 | 320 | | | Existing weld L = 10 mm |
| J | 5.5 | 8.0 | 320 | | | Sheet gap tg = 2.0 mm |
| K | 5.0 | 8.0 | 320 | | | None |
| L | 5.0 | 9.5 | 320 | | | Existing weld L = 10 mm |
| M | 5.0 | 5.0 | 100 | 8.0 | 260 | Sheet gap tg = 2.0 mm |
| N | 5.0 | 8.2 | 340 | | | None |
| O | 5.0 | 9.7 | 340 | | | Existing weld L = 10 mm |
| P | 5.0 | 5.0 | 120 | 8.0 | 260 | Sheet gap tg = 1.6 mm |
| Q | 4.0 | 8.0 | 240 | | | None |
| R | 4.0 | 9.0 | 240 | | | Existing weld L = 10 mm |
| S | 4.0 | 7.5 | 240 | | | Sheet gap tg = 1.6 mm |
| T | 5.0 | 4.0 | 120 | 6.0 | 260 | None |
| U | 5.0 | 6.0 | 120 | 7.5 | 260 | Existing weld L = 10 mm |
| V | 5.0 | 3.5 | 200 | 5.7 | 260 | Sheet gap tg = 2.0 mm |
| W | 6.0 | 4.5 | 180 | 6.5 | 280 | None |
| X | 6.0 | 6.0 | 180 | 8.0 | 280 | Existing weld L = 10 mm |
| Y | 6.0 | 4.0 | 240 | 6.0 | 280 | Sheet gap tg = 1.6 mm |

TABLE 2

| | | | Actual welding condition | | | |
|---|---|---|---|---|---|---|
| | | | Sheet combination | | | |
| No. | Joint No. | Compared test welding No. | Steel sheet of reference sign 11 in the drawings | Steel sheet of reference sign 12 in the drawings | Steel sheet of reference sign 13 in the drawings | Set electrode force Fm' (kN) |
| 1 | 1-1 | A, B, C | 980 MPa-grade cold-rolled steel sheet (sheet thickness: 1.6 mm) | 980 MPa-grade cold-rolled steel sheet (sheet thickness: 1.6 mm) | | 5.0 |
| | 1-2 | | 980 MPa-grade cold-rolled steel sheet (sheet thickness: 1.6 mm) | 980 MPa-grade cold-rolled steel sheet (sheet thickness: 1.6 mm) | | 5.0 |
| | 1-3 | | 980 MPa-grade cold-rolled steel sheet (sheet thickness: 1.6 mm) | 980 MPa-grade cold-rolled steel sheet (sheet thickness: 1.6 mm) | | 5.0 |
| | 1-4 | | 980 MPa-grade cold-rolled steel sheet (sheet thickness: 1.6 mm) | 980 MPa-grade cold-rolled steel sheet (sheet thickness: 1.6 mm) | | 5.0 |
| | 1-5 | | 980 MPa-grade cold-rolled steel sheet (sheet thickness: 1.6 mm) | 980 MPa-grade cold-rolled steel sheet (sheet thickness: 1.6 mm) | | 5.0 |
| 2 | 2-1 | A, B | 980 MPa-grade cold-rolled steel sheet (sheet thickness: 1.6 mm) | 980 MPa-grade cold-rolled steel sheet (sheet thickness: 1.6 mm) | | 5.0 |
| | 2-2 | | 980 MPa-grade cold-rolled steel sheet (sheet thickness: 1.6 mm) | 980 MPa-grade cold-rolled steel sheet (sheet thickness: 1.6 mm) | | 5.0 |
| | 2-3 | | 980 MPa-grade cold-rolled steel sheet (sheet thickness: 1.6 mm) | 980 MPa-grade cold-rolled steel sheet (sheet thickness: 1.6 mm) | | 5.0 |
| 3 | 3-1 | D | 980 MPa-grade cold-rolled steel sheet (sheet thickness: 1.6 mm) | 980 MPa-grade cold-rolled steel sheet (sheet thickness: 1.6 mm) | | 5.0 |
| | 3-2 | | 980 MPa-grade cold-rolled steel sheet (sheet thickness: 1.6 mm) | 980 MPa-grade cold-rolled steel sheet (sheet thickness: 1.6 mm) | | 5.0 |
| | 3-3 | | 980 MPa-grade cold-rolled steel sheet (sheet thickness: 1.6 mm) | 980 MPa-grade cold-rolled steel sheet (sheet thickness: 1.6 mm) | | 5.0 |
| 4 | 4-1 | E, F, G | 1180 MPa-grade cold-rolled steel sheet (sheet thickness: 1.6 mm) | 1180 MPa-grade cold-rolled steel sheet (sheet thickness: 1.6 mm) | | 5.0 |
| | 4-2 | | 1180 MPa-grade cold-rolled steel sheet (sheet thickness: 1.6 mm) | 1180 MPa-grade cold-rolled steel sheet (sheet thickness: 1.6 mm) | | 5.0 |
| | 4-3 | | 1180 MPa-grade cold-rolled steel sheet (sheet thickness: 1.6 mm) | 1180 MPa-grade cold-rolled steel sheet (sheet thickness: 1.6 mm) | | 5.0 |

TABLE 2-continued

| | | | | | | |
|---|---|---|---|---|---|---|
| | 4-4 | | 1180 MPa-grade cold-rolled steel sheet (sheet thickness: 1.6 mm) | 1180 MPa-grade cold-rolled steel sheet (sheet thickness: 1.6 mm) | | 5.0 |
| | 4-5 | | 1180 MPa-grade cold-rolled steel sheet (sheet thickness: 1.6 mm) | 1180 MPa-grade cold-rolled steel sheet (sheet thickness: 1.6 mm) | | 5.0 |
| 5 | 5-1 | H, I, J | 1180 MPa-grade GA steel sheet (sheet thickness: 1.6 mm) | 1180 MPa-grade GA steel sheet (sheet thickness: 1.6 mm) | | 5.5 |
| | 5-2 | | 1180 MPa-grade GA steel sheet (sheet thickness: 1.6 mm) | 1180 MPa-grade GA steel sheet (sheet thickness: 1.6 mm) | | 5.5 |
| | 5-3 | | 1180 MPa-grade GA steel sheet (sheet thickness: 1.6 mm) | 1180 MPa-grade GA steel sheet (sheet thickness: 1.6 mm) | | 5.5 |
| | 5-4 | | 1180 MPa-grade GA steel sheet (sheet thickness: 1.6 mm) | 1180 MPa-grade GA steel sheet (sheet thickness: 1.6 mm) | | 5.5 |
| | 5-5 | | 1180 MPa-grade GA steel sheet (sheet thickness: 1.6 mm) | 1180 MPa-grade GA steel sheet (sheet thickness: 1.6 mm) | | 5.5 |
| 6 | 6-1 | K, L, M | 1470 MPa-grade cold-rolled steel sheet (sheet thickness: 1.6 mm) | 1470 MPa-grade cold-rolled steel sheet (sheet thickness: 1.6 mm) | | 5.0 |
| | 6-2 | | 1470 MPa-grade cold-rolled steel sheet (sheet thickness: 1.6 mm) | 1470 MPa-grade cold-rolled steel sheet (sheet thickness: 1.6 mm) | | 5.0 |
| | 6-3 | | 1470 MPa-grade cold-rolled steel sheet (sheet thickness: 1.6 mm) | 1470 MPa-grade cold-rolled steel sheet (sheet thickness: 1.6 mm) | | 5.0 |
| | 6-4 | | 1470 MPa-grade cold-rolled steel sheet (sheet thickness: 1.6 mm) | 1470 MPa-grade cold-rolled steel sheet (sheet thickness: 1.6 mm) | | 5.0 |
| | 6-5 | | 1470 MPa-grade cold-rolled steel sheet (sheet thickness: 1.6 mm) | 1470 MPa-grade cold-rolled steel sheet (sheet thickness: 1.6 mm) | | 5.0 |
| 7 | 7-1 | N, O, P | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 5.0 |
| | 7-2 | | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 5.0 |
| | 7-3 | | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 5.0 |
| | 7-4 | | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 5.0 |
| | 7-5 | | 270 MPa-grade GA steel sheet (sheet thickness: 0.7 mm) | 980 MPa-grade GA steel sheet (sheet thickness: 1.4 mm) | 980 MPa-grade GA steel sheet (sheet thickness: 1.2 mm) | 5.0 |
| 8 | 8-1 | Q, R, S | 1470 MPa-grade GA steel sheet (sheet thickness: 1.0 mm) | 1470 MPa-grade GA steel sheet (sheet thickness: 1.0 mm) | | 4.0 |

TABLE 2-continued

| | | | | | | |
|---|---|---|---|---|---|---|
| | 8-2 | | 1470 MPa-grade GA steel sheet (sheet thickness: 1.0 mm) | 1470 MPa-grade GA steel sheet (sheet thickness: 1.0 mm) | | 4.0 |
| | 8-3 | | 1470 MPa-grade GA steel sheet (sheet thickness: 1.0 mm) | 1470 MPa-grade GA steel sheet (sheet thickness: 1.0 mm) | | 4.0 |
| | 8-4 | | 1470 MPa-grade GA steel sheet (sheet thickness: 1.0 mm) | 1470 MPa-grade GA steel sheet (sheet thickness: 1.0 mm) | | 4.0 |
| | 8-5 | | 1470 MPa-grade GA steel sheet (sheet thickness: 1.0 mm) | 1470 MPa-grade GA steel sheet (sheet thickness: 1.0 mm) | | 4.0 |
| 9 | 9-1 | T, U, V | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 5.0 |
| | 9-2 | | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 5.0 |
| | 9-3 | | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 5.0 |
| | 9-4 | | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 5.0 |
| | 9-5 | | 1800 MPa-grade Zn—Ni-coated hot stamp steel sheet (sheet thickness: 1.6 mm) | 1800 MPa-grade Zn—Ni-coated hot stamp steel sheet (sheet thickness: 1.6 mm) | | 5.0 |
| 10 | 10-1 | W, X, Y | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 6.0 |
| | 10-2 | | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 6.0 |
| | 10-3 | | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 6.0 |
| | 10-4 | | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 6.0 |
| | 10-5 | | 270 MPa-grade GA steel sheet (sheet thickness: 0.7 mm) | 2000 MPa-grade Zn—Ni-coated hot stamp steel sheet (sheet thickness: 1.4 mm) | 1180 MPa-grade GA steel sheet (sheet thickness: 1.6 mm) | 6.0 |

| | | | Actual welding condition | | | | |
|---|---|---|---|---|---|---|---|
| No. | Joint No. | Disturbance state | Test welding No. followed in main current passage | Nugget diameter (mm) | Expulsion | Evaluation | Remarks |
| 1 | 1-1 | Existing weld L = 40 mm | A | 5.9 | None | Good | Ex. |
| | 1-2 | Existing weld L = 7.5 mm | B | 6.0 | None | Good | |

TABLE 2-continued

| | | | | | | | |
|---|---|---|---|---|---|---|---|
| | 1-3 | Sheet gap tg = 0.5 mm | A | 6.1 | None | Good | |
| | 1-4 | Sheet gap tg = 1.0 mm | C | 5.9 | None | Good | |
| | 1-5 | None | A | 6.2 | None | Good | |
| 2 | 2-1 | Existing weld L = 40 mm | A | 5.9 | None | Good | Ex. |
| | 2-2 | Existing weld L = 7.5 mm | B | 6.0 | None | Good | |
| | 2-3 | None | A | 6.2 | None | Good | |
| 3 | 3-1 | Existing weld L = 7.5 mm | D | 4.7 | None | Poor | Comp. Ex. |
| | 3-2 | None | D | 5.8 | None | Good | |
| | 3-3 | Sheet gap tg = 1.0 mm | D | 6.7 | Occurred | Poor | |
| 4 | 4-1 | Existing weld L = 40 mm | E | 6.2 | None | Good | Ex. |
| | 4-2 | Existing weld L = 7.5 mm | F | 6.1 | None | Good | |
| | 4-3 | Sheet gap tg = 0.5 mm | E | 6.5 | None | Good | |
| | 4-4 | Sheet gap tg = 1.0 mm | G | 6.2 | None | Good | |
| | 4-5 | None | E | 6.4 | None | Good | |
| 5 | 5-1 | Existing weld L = 40 mm | H | 6.3 | None | Good | Ex. |
| | 5-2 | Existing weld L = 7.5 mm | I | 6.2 | None | Good | |
| | 5-3 | Sheet gap tg = 1.8 mm | J | 6.1 | None | Good | |
| | 5-4 | Sheet gap tg = 2.0 mm | J | 5.8 | None | Good | |
| | 5-5 | None | H | 6.4 | None | Good | |
| 6 | 6-1 | Existing weld L = 40 mm | K | 6.0 | None | Good | Ex. |
| | 6-2 | Existing weld L = 7.5 mm | L | 6.4 | None | Good | |
| | 6-3 | Sheet gap tg = 2.0 mm | M | 5.9 | None | Good | |
| | 6-4 | Sheet gap tg = 1.8 mm | M | 6.1 | None | Good | |
| | 6-5 | None | K | 6.2 | None | Good | |
| 7 | 7-1 | Existing weld L = 40 mm | N | 4.4 | None | Good | Ex. |
| | 7-2 | Existing weld L = 7.5 mm | O | 4.1 | None | Good | |
| | 7-3 | Sheet gap tg = 0.5 mm | N | 4.4 | None | Good | |
| | 7-4 | Sheet gap tg = 2.0 mm | P | 3.9 | None | Good | |
| | 7-5 | None | N | 4.2 | None | Good | |
| 8 | 8-1 | Existing weld L = 40 mm | Q | 4.8 | None | Good | Ex. |
| | 8-2 | Existing weld L = 7.5 mm | R | 5.0 | None | Good | |
| | 8-3 | Sheet gap tg = 0.5 mm | Q | 4.9 | None | Good | |
| | 8-4 | Sheet gap tg = 2.0 mm | S | 4.7 | None | Good | |
| | 8-5 | None | Q | 5.0 | None | Good | |
| 9 | 9-1 | Existing weld L = 40 mm | T | 6.0 | None | Good | Ex. |
| | 9-2 | Existing weld L = 7.5 mm | U | 5.9 | None | Good | |
| | 9-3 | Sheet gap tg = 0.5 mm | T | 6.2 | None | Good | |
| | 9-4 | Sheet gap tg = 2.0 mm | V | 6.1 | None | Good | |
| | 9-5 | None | T | 6.0 | None | Good | |
| 10 | 10-1 | Existing weld L = 40 mm | W | 4.2 | None | Good | Ex. |
| | 10-2 | Existing weld L = 7.5 mm | X | 4.3 | None | Good | |
| | 10-3 | Sheet gap tg = 0.5 mm | W | 4.1 | None | Good | |
| | 10-4 | Sheet gap tg = 2.0 mm | Y | 4.5 | None | Good | |
| | 10-5 | None | W | 4.1 | None | Good | |

In all Examples (Ex.), no expulsion occurred, and a nugget with a diameter of $4.5\sqrt{t'}$ or more was obtained, regardless of the disturbance state. In Comparative Examples (Comp. Ex.), a nugget with a diameter of $4.5\sqrt{t'}$ or more was obtained without expulsion in a state of no disturbance, but expulsion occurred or a nugget with a sufficient diameter was not formed in the case where the effect of a disturbance was significant.

The same results as above were obtained in the case where an average value of resistance between electrodes was stored in the preliminary current passage in the test welding, and an average value of resistance between electrodes in the preliminary current passage in the actual welding and an average value of resistance between electrodes stored in the preliminary current passage in the test welding were compared for each welding condition to set the target of the time variation curve of the instantaneous amount of heat generated and the cumulative amount of heat generated when performing adaptive control welding in the main current passage in the actual welding.

REFERENCE SIGNS LIST 11, 12, 13 metal sheet
14 electrode
15 spacer
16 existing weld

The invention claimed is:

1. A resistance spot welding method of squeezing, by a pair of electrodes, parts to be welded which are a plurality of overlapping metal sheets, and passing a current while applying an electrode force to join the parts to be welded, the resistance spot welding method comprising:
performing test welding; and
performing actual welding after the test welding,
wherein the test welding is performed under each of two or more welding conditions, at least one welding condition is that welding is performed in a simulated state of disturbance, and another welding condition is that welding is performed in a state of no current shunting or a sheet gap,
in the test welding, for each of the welding conditions:
preliminary current passage is performed by constant current control in a same current pattern, and an electrical property between the electrodes in the preliminary current passage is stored; and
thereafter main current passage is performed by constant current control, and a time variation curve of an instantaneous amount of heat generated per unit volume and a cumulative amount of heat generated per unit volume that are calculated from an electrical property between the electrodes in forming an appropriate nugget are stored, and
in the actual welding:
preliminary current passage is performed by constant current control in the same current pattern as in the preliminary current passage of the test welding, an electrical property between the electrodes in the preliminary current passage in the actual welding and an electrical property between the electrodes stored in the preliminary current passage in the test welding are compared to determine a difference therebetween for each of the welding conditions of the test welding, and a time variation curve of an instantaneous amount of heat generated per unit volume and a cumulative amount of heat generated per unit volume in the main current passage in the test welding that are stored for a welding condition corresponding to a smallest difference are set as a target in main current passage in the actual welding; and
thereafter adaptive control welding is performed to control a current passage amount according to the target, as the main current passage in the actual welding.

2. The resistance spot welding method according to claim 1, wherein in the adaptive control welding, welding is performed with the time variation curve of the instantaneous amount of heat generated per unit volume and the cumulative amount of heat generated being set as the target, and in the case where an amount of time variation of an instantaneous amount of heat generated per unit volume differs from the time variation curve, the current passage amount is controlled in order to compensate for the difference from the time variation curve within a remaining welding time so that a cumulative amount of heat generated per unit volume in the main current passage in the actual welding matches the cumulative amount of heat generated per unit volume set as the target.

3. The resistance spot welding method according to claim 1, wherein the test welding is performed under each of three or more welding conditions.

4. The resistance spot welding method according to claim 1, wherein a relationship Fp<Fm is satisfied, where Fp is a set electrode force in the preliminary current passage in the test welding and Fm is a set electrode force in the main current passage in the test welding.

5. A weld member production method comprising joining a plurality of overlapping metal sheets by the resistance spot welding method according to claim 1.

6. The resistance spot welding method according to claim 2, wherein the test welding is performed under each of three or more welding conditions.

7. The resistance spot welding method according to claim 2, wherein a relationship Fp<Fm is satisfied, where Fp is a set electrode force in the preliminary current passage in the test welding and Fm is a set electrode force in the main current passage in the test welding.

8. The resistance spot welding method according to claim 3, wherein a relationship Fp<Fm is satisfied, where Fp is a set electrode force in the preliminary current passage in the test welding and Fm is a set electrode force in the main current passage in the test welding.

9. The resistance spot welding method according to claim 6, wherein a relationship Fp<Fm is satisfied, where Fp is a set electrode force in the preliminary current passage in the test welding and Fm is a set electrode force in the main current passage in the test welding.

10. A weld member production method comprising joining a plurality of overlapping metal sheets by the resistance spot welding method according to claim 2.

11. A weld member production method comprising joining a plurality of overlapping metal sheets by the resistance spot welding method according to claim 3.

* * * * *